(12) United States Patent
Lee et al.

(10) Patent No.: US 9,311,846 B2
(45) Date of Patent: Apr. 12, 2016

(54) DISPLAY APPARATUS AND CONTROL METHOD THEREOF

(71) Applicant: SAMSUNG ELECTRONICS CO., LTD., Suwon (KR)

(72) Inventors: Hee-won Lee, Paju (KR); Ju-yong Kim, Suwon (KR); Young-ran Han, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 77 days.

(21) Appl. No.: 14/066,867

(22) Filed: Oct. 30, 2013

(65) Prior Publication Data

US 2014/0118227 A1    May 1, 2014

(30) Foreign Application Priority Data

Oct. 30, 2012  (KR) .......................... 10-2012-0121310

(51) Int. Cl.
| | |
|---|---|
| *G09G 5/00* | (2006.01) |
| *G09G 3/32* | (2006.01) |
| *G09F 27/00* | (2006.01) |
| *G06F 1/16* | (2006.01) |
| *G06F 3/0488* | (2013.01) |
| *G06F 3/01* | (2006.01) |

(52) U.S. Cl.
CPC ............ *G09G 3/3208* (2013.01); *G09F 27/005* (2013.01); *G06F 1/1632* (2013.01); *G06F 1/1694* (2013.01); *G06F 3/011* (2013.01); *G06F 3/0488* (2013.01); *G06F 3/04886* (2013.01); *G09G 2320/0261* (2013.01); *G09G 2340/04* (2013.01); *G09G 2340/0492* (2013.01); *G09G 2354/00* (2013.01)

(58) Field of Classification Search
CPC combination set(s) only.
See application file for complete search history.

(56) References Cited

U.S. PATENT DOCUMENTS

| | | | |
|---|---|---|---|
| 6,466,202 B1 | 10/2002 | Suso et al. | |
| 7,511,630 B2 * | 3/2009 | Strickland et al. | ......... 340/815.4 |
| 7,978,184 B2 | 7/2011 | Morrison | |
| 2002/0158999 A1 | 10/2002 | Shima | |
| 2011/0261058 A1 * | 10/2011 | Luo | ............................... 345/441 |
| 2012/0038663 A1 | 2/2012 | Gustafsson et al. | |

(Continued)

FOREIGN PATENT DOCUMENTS

| | | |
|---|---|---|
| WO | 2008/128245 A1 | 10/2008 |
| WO | 2012/058150 A1 | 5/2012 |

OTHER PUBLICATIONS

Extended European Search Report mailed Jan. 21, 2014 in related European Application No. 13167720.5.

*Primary Examiner* — Linh N Hoffner
(74) *Attorney, Agent, or Firm* — Staas & Halsey LLP

(57) ABSTRACT

A display apparatus and control method are provided. The display apparatus includes a transparent display panel, an image processor that processes an image signal to display an image on the transparent display panel based on the processed image signal, a sensor which senses a user located in front of and behind the transparent display panel. The display apparatus includes a controller that determines by the sensor whether a user is located in front of, or behind, the transparent display panel if the image is displayed on the transparent display panel to be normally recognized by a user located in front of the transparent display panel. The controller controls the image processor to selectively display on the transparent display panel a reverse image of the image to be normally recognized by a user located behind the transparent display panel according to the determination.

18 Claims, 11 Drawing Sheets

(56) References Cited

U.S. PATENT DOCUMENTS

| | | | |
|---|---|---|---|
| 2012/0105428 A1* | 5/2012 | Fleck et al. | 345/419 |
| 2012/0236022 A1* | 9/2012 | Homma et al. | 345/619 |
| 2012/0256886 A1* | 10/2012 | Ryu et al. | 345/204 |

* cited by examiner

DISPLAY APPARATUS AND CONTROL
METHOD THEREOF

CROSS-REFERENCE TO RELATED
APPLICATIONS

This application is related to, and claims priority to, Korean Patent Application No. 10-2012-0121310, filed on Oct. 30, 2012 in the Korean Intellectual Property Office, the disclosure of which is incorporated herein by reference.

BACKGROUND

1. Field

Exemplary embodiments of the present disclosure relate to a display apparatus and a control method thereof that process an image signal and display an image based on the processed image signal, and more particularly, to a display apparatus and a control method thereof that includes a transparent display panel and displays an image for users to view the image normally regardless of their locations.

2. Description of the Related Art

A display apparatus includes a display panel to display an image thereon, and displays, for example, broadcasting signals and image signals/image data in various formats. The display apparatus may be implemented as a TV or monitor. Such a display panel may be implemented as various types such as a liquid crystal display (LCD) panel, a plasma display panel (PDP), etc. and is used in various display apparatuses. An image that is displayed on general display panels used in the display apparatuses may be recognized by a user located only in a particular direction relative to the display panel, e.g., only by a user located in front of the display panel. That is, a user who is located behind the display panel may not recognize the image displayed on the panel, and general display panels usually provide images only visible by a user in one direction.

In consideration of the foregoing, a display apparatus having a transparent display panel is being provided. Unlike other display panels, a transparent display panel enables a user, who is located in front of the panel, to recognize a rear side of the panel. The transparent display panel displays an image on a transparent material, e.g., glass, and users who are located in front of, and behind, the panel may recognize an image displayed on the panel.

However, if a predetermined image displayed by the transparent display panel is normally recognized by a user located in front of the panel, a reverse of the image may be recognized by another user who is located behind the panel. The transparent display panel may provide the image to users who are located in front of, and behind, the panel, respectively, but provides a reverse image to a user located in a particular direction.

SUMMARY

Additional aspects and/or advantages will be set forth in part in the description which follows and, in part, will be apparent from the description, or may be learned by practice of the invention.

According to an aspect of an exemplary embodiment of the present invention, a display apparatus includes a transparent display panel, an image processor which processes an image signal to display an image on the transparent display panel based on the processed image signal, a sensor capable of sensing a user located in front of and behind the transparent display panel; and a controller that determines by the sensor whether a user is located in front of or behind the transparent display panel if the image is displayed on the transparent display panel to be normally recognized by a user located in front of the transparent display panel, and controls the image processor to selectively display on the transparent display panel a reverse image of the image to be normally recognized by a user located behind the transparent display panel according to the determination.

If the sensor senses that users are in front of, and/or behind, the transparent display panel, respectively, the controller may display the image and the reverse image together.

The controller may compare a number of users located in front of the transparent display panel sensed by the sensor and a number of users located behind the transparent display panel sensed by the sensor, and if it is sensed that the number of users located in front of the transparent display panel is equal to the number of users located behind the transparent display panel, may display the image and the reverse image together.

The controller may determine a user's location by the sensor, and may display one of the image and the reverse image that is normally recognized by a user located at the determined location, adjacently to the determined location on the transparent display panel.

The controller may display one of the image and the reverse image that is normally recognized by a user located at the determined location, in a location corresponding to a height of a user's sight sensed by the sensor.

The controller may compare the number of users located in front of the transparent display panel sensed by the sensor with the number of users located behind the transparent display panel sensed by the sensor, and may selectively display the reverse image according to the comparison result.

If the number of users located in front of the transparent display panel is larger than the number of users located behind the transparent display panel, the controller may display the image, and if the number of users located behind the transparent display panel is larger than the number of users located in front of the transparent display panel, may display the reverse image.

If it is sensed through the sensor that users are located in front of and behind the transparent display panel, the controller may alternately display the image and the reverse image.

The controller may compare the number of users located in front of the transparent display panel sensed by the sensor with the number of users located behind the transparent display panel sensed by the sensor, and according to the comparison results, may differently set up a display period of the image and a display period of the reverse image.

If the number of users located in front of the transparent display panel is larger than the number of users located behind the transparent display panel, the controller may set up the display period of the image to be longer than the display period of the reverse image, and if the number of users located behind the transparent display panel is larger than the number of users located in front of the transparent display panel, may set up the display period of the reverse image to be longer than the display period of the image.

According to an aspect of the present invention may be achieved by providing a control method of a display apparatus including a transparent display panel is provided, the control method including displaying an image on the transparent display panel to be normally recognized by a user located in front of the transparent display panel out of users located in front of and behind the transparent display panel, sensing users located in front of and behind the transparent display panel; and selectively displaying on the transparent display panel a reverse image of the image to be normally recognized by a user located behind the transparent display panel according to the sensing result.

The selectively displaying the reverse image may include displaying the image and the reverse image together if it is sensed that users are located both in front of and behind the transparent display panel.

The displaying the image and the reverse image together may include comparing the number of users located in front of the transparent display panel with the number of users located behind the transparent display panel, and if the number of users located in front of the transparent display panel is equal to the number of users located behind the transparent display panel, displaying the image and the reverse image together.

The displaying the image and the reverse image together may include sensing a user's location, and displaying one of the image and the reverse image that is normally recognized by a user located at the sensed location, adjacently to the sensed location on the transparent display panel.

The displaying the image and the reverse image together may include displaying one of the image and the reverse image that is normally recognized by a user located at the sensed location, at a location corresponding to a height of a user's sight sensed by the sensor.

The selectively displaying the reverse image may include comparing the number of users located in front of the transparent display panel with the number of users located behind the transparent display panel, and selectively displaying the reverse image according to the comparison result.

The selectively displaying the reverse image may include displaying the image if the number of users located in front of the transparent display panel is larger than the number of users located behind the transparent display panel, and displaying the reverse image if the number of users located behind the transparent display panel is larger than the number of users located in front of the transparent display panel.

The selectively displaying the reverse image may include alternately displaying the image and the reverse image if it is sensed that users are located in front of and behind the transparent display panel.

The alternately displaying the image and the reverse image may include comparing the number of users located in front of the transparent display panel with the number of users located behind the transparent display panel and according to the comparison result, differently setting up a display period of the image and a display period of the reverse image.

The setting up the display period of the image and the display period of the reverse image differently may include setting up the display period of the image to be longer than the display period of the reverse image if the number of users located in front of the transparent display panel is larger than the number of users located behind the transparent display panel, and setting up the display period of the reverse image to be longer than the display period of the image if the number of users located behind the transparent display panel is larger than the number of users located in front of the transparent display panel.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION

Figure 1:
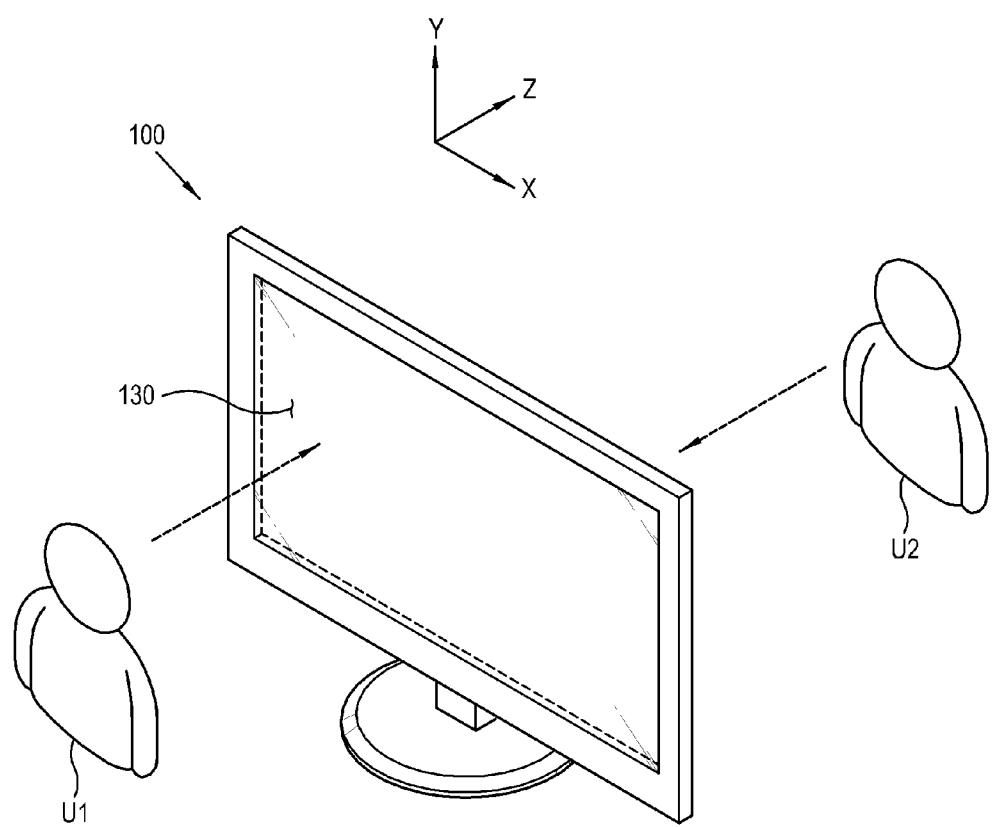
FIG. 1 illustrates an exemplary display apparatus according to an embodiment.

Exemplary embodiments are disclosed in detail with reference to accompanying drawings. The exemplary embodiments may be embodied in various forms without being limited to the exemplary embodiments set forth herein. Descriptions of well-known parts are omitted for clarity, and like reference numerals refer to like elements throughout.

FIG. 1 illustrates an example of a display apparatus 100 according to an embodiment.

As illustrated therein, the display apparatus 100 according to an embodiment processes an image signal according to preset image processing operations, and displays an image on a display panel 130 based on the processed image signal. The display apparatus 100 according to an embodiment may be installed in a predetermined space such as public space and provides an image to a plurality of users, e.g., U1 and U2, but not limited thereto. Alternatively, the display apparatus 100 may be implemented as various devices within the scope of an embodiment.

Directions X, Y and Z illustrated in FIG. 1 are used for purposes to explain the arrangement relationship between objects in a space. Axes in the directions X, Y and Z may be perpendicular to one another. The direction X is a transverse direction of the display apparatus 100 or the display panel 130, and the direction Y is a vertical direction of the display apparatus 100 or the display panel 130. That is, the display panel 130 has an image displaying area that is in parallel with a plane X-Y.

The direction Z is a perpendicular direction to the plane X-Y. The front side of the display apparatus 100 or the display panel 130 according to an embodiment may be defined as a direction −Z from the display apparatus 100 or the display panel 130. The rear side of the display apparatus 100 or the display panel 130 may be defined as the direction Z from the display apparatus 100 or display panel 130.

The user U1 who is located in front of the display panel 130 may be designated as a first user U1, and the user U2 who is located behind the display panel 130 may be named as a second user U2. That is, the first user U1 is located in the direction −Z of the display panel 130, and the second user U2 is located in the direction Z of the display panel 130.

The display panel 130 according to an embodiment may be implemented as a transparent display panel. That is, as external light may transmit the image displaying area of the display panel 130, the first user U1 views the image displayed on the display panel 130, and concurrently may recognize the second user U2 who is behind the display panel 130 through the display panel 130.

The predetermined image that is displayed on the display panel 130 may be viewed by both the first user U1 and the second user U2. However, if the image displayed on the display panel 130 is normally recognized by the first user U1, the image may be recognized by the second user as the image with the reversed left and right sides.

Figure 2:
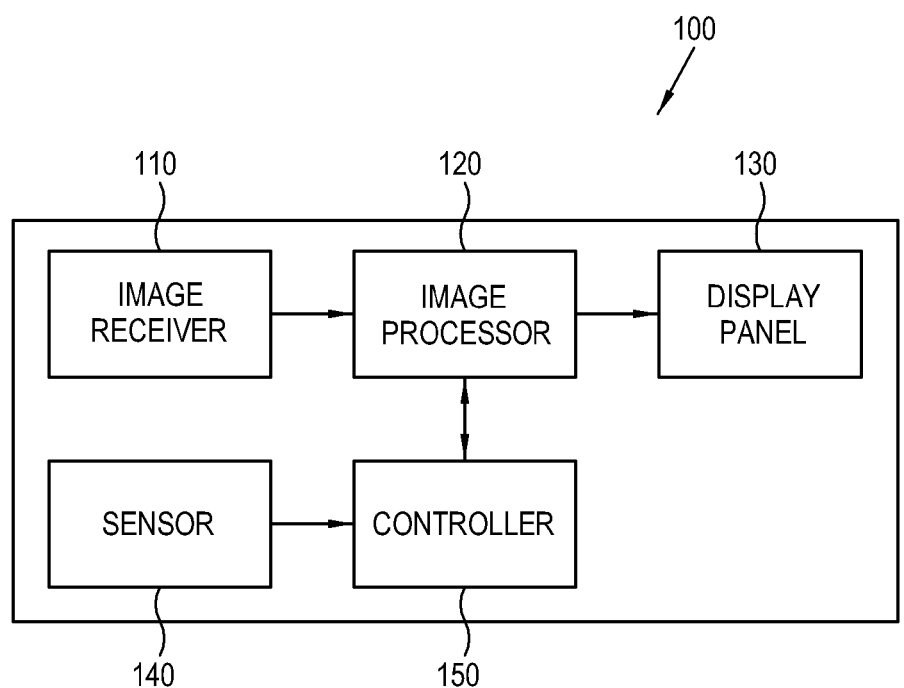
FIG. 2 is an exemplary block diagram of a display apparatus.

FIG. 2 illustrates an exemplary block diagram of a display apparatus, e.g., display apparatus 100.

As illustrated therein, the display apparatus 100 includes an image receiver 110 to receive an image signal, an image processor 120 to process the image signal received by the image receiver 110, a display panel 130 to display an image thereon based on the image signal processed by the image processor 120, a sensor 140 to sense a location of a user, and a controller 150 to control overall elements of the display apparatus 100.

The image receiver 110 receives image signals in a wired/wireless manner from an image supply source (not shown) and transmits the image signal to the image processor 120. The signals and/or images may be of various types depending on a standard of a received image signal and an embodiment type of the display apparatus 100. For example, the image receiver 110 may receive digital image signals according to a high definition multimedia interface (HDMI), or receive image data packet stream from a streaming server (not shown).

The image processor 120 processes the image signal transmitted by the image receiver 100, for example, according to preset various image processing operations. The image processor 120 outputs the processed image signal to the display panel 130, on which an image is displayed on the basis of the processed image signal.

The image processing operations of the image processor 120 may include, but is not limited to, a decoding operation corresponding to an image format of an image signal, a de-interlacing operation for converting an interlace image signal into a progressive image signal, a scaling operation for adjusting an image signal into a preset resolution, a noise reduction operation for improving an image quality, a detail enhancement operation, a frame refresh rate conversion, etc.

The image processor 120 may be implemented as a system-on-chip (SOC) that integrates the foregoing functions, or as an image processing board (not shown) that is formed by mounting individual elements on a printed circuit board (PCB) (not shown) to perform the foregoing image processing operations.

The display panel 130 displays an image thereon based on the image signal output by the image processor 120. The display panel 130 may be implemented as a transparent display panel, and emits light by itself by employing a transparent organic light emitting diode (OLED) to display an image, or displays an image by external light without any additional light emitting component, or may be implemented as other various types of panels.

The sensor 140 senses a user from the external environment of the display apparatus 100. The sensor 140 senses a location and the number of user(s), and the height of a user's sight based on the display apparatus 100. The type of the sensor 140 is not limited, and embodiments include employ various sensors including a camera or infrared sensor.

An exemplary case where an image 300 is displayed on a display panel, e.g., display panel 130 is described with reference to FIG. 3.

Figure 3:
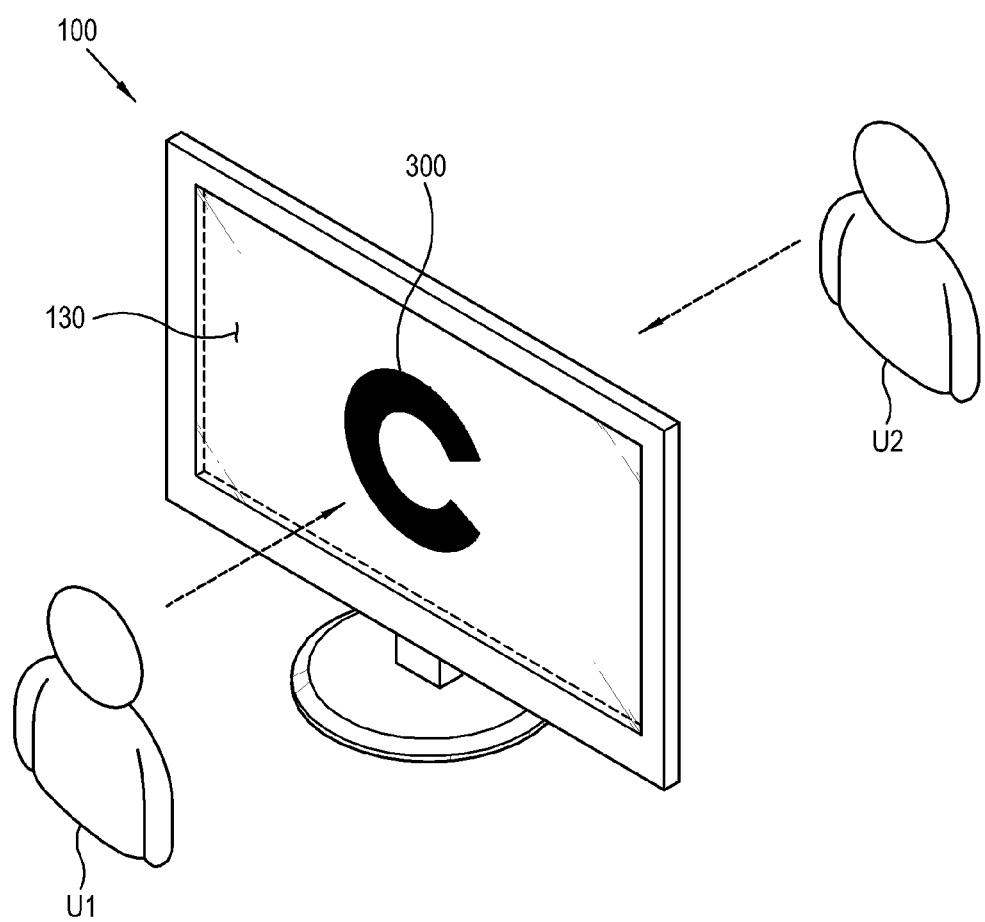
FIG. 3 illustrates an exemplary displaying of an image on a display panel.

FIG. 3 illustrates an example of displaying an image 300 on the display panel 130.

As illustrated therein, the controller 150 controls the image processor 120 to display a predetermined image 300 on the display panel 130. As the display panel 130 includes a transparent display panel, a first user U1 who is in front of the display panel 130 and a second user U2 who is behind the display panel 130 may all view the image 300.

If the display panel 130 provides the image 300 in both forward and backward directions, the controller 150 displays the image 300 to be normally recognized by the first user U1 located in one direction, e.g., a forward direction. This indicates that the image 300 is not normally recognized by the user U2 located in another direction.

That is, with respect to the same image 300, the first user U1 normally recognizes the image 300 but the second user U2 recognizes the image 300 with the left and right sides reversed. If the second user U2 r views the image 300 with the left and right sides reversed, they may believe that the viewed image is different than the provider or producer of the image 300 intended.

For example, if the image 300 includes a sentence, the second user U2 may view the reverse image as illegible.

An exemplary method is disclosed according to an embodiment.

When the image 300 is displayed to be recognized normally by the first user U1 located in front of the display panel 130, the controller 150 controls the sensor 140 to sense which of the forward and backward directions of the display panel 130 the users U1 and U2 are located in. According to the sensing result, the controller 150 selectively displays the reverse image of the image 300 to be normally recognized by the second user U2 located behind the display panel 130.

The display apparatus 100 that includes the transparent display panel 130 may provide the image that can be normally recognized by both the users U1 and U2 who are in front of, and behind, the display apparatus 100.

An exemplary method of displaying the reverse image may have various embodiments.

Figure 4:
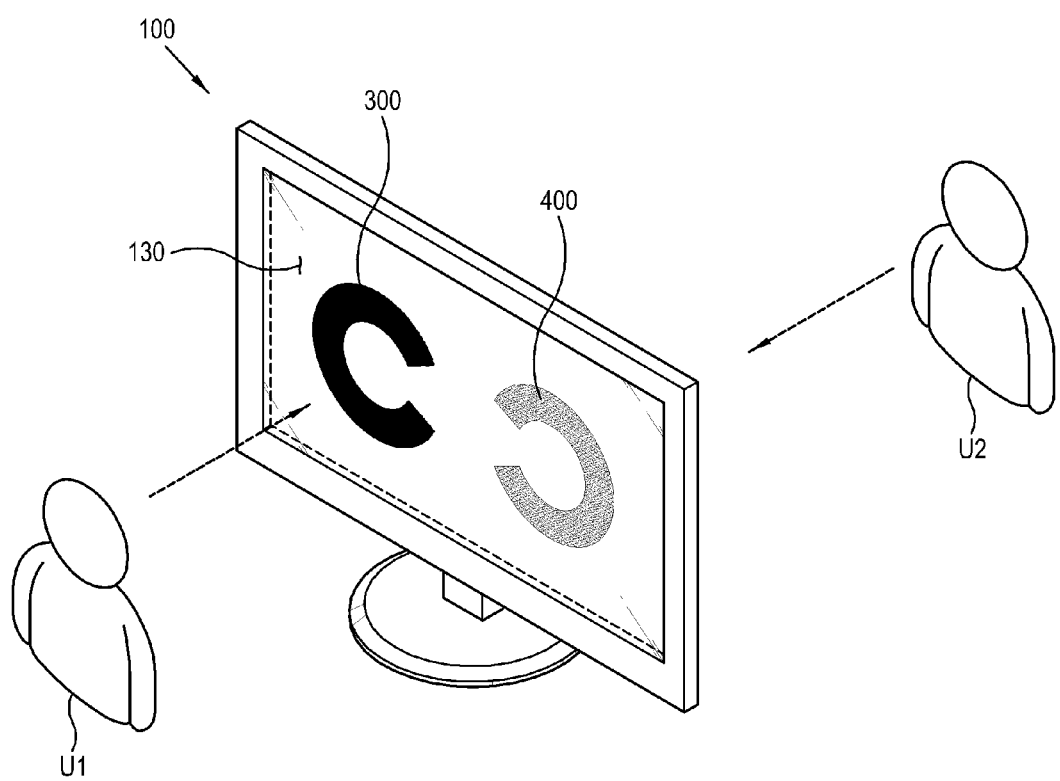
FIG. 4 illustrates an exemplary method of displaying a reverse image by the display apparatus.

FIG. 4 illustrates an exemplary method of displaying a reverse image by the display apparatus 100 according to an embodiment.

As illustrated therein, according to an exemplary embodiment, user U1 is located in front of the display apparatus 100 and user U2 is located behind the display apparatus 100. If the sensor 140 senses that the users U1 and U2 are respectively, in front of, and behind, the display apparatus 100, the controller 150 displays the image 300 together with the reverse image 400 on the display panel 130. The reverse image 400 may be defined as an image that forms a mirror image with respect to the image 300 by reversing the left and right sides of the image 300.

The image 300 is normally recognized by the first user U1, and reversely recognized by the second user U2. The reverse image 400 is reversely recognized by the first user U1, and normally recognized by the second user U2.

Accordingly, if the image 300 and the reverse image 400 are displayed together, the first user U1 views the image 300 and the second user U2 may view the reverse image 400. The display apparatus 100 may provide the images 300 and 400 that may be normally recognized by the first user U1 and the second user U2, respectively.

According to an exemplary embodiment, the number of users U1 and U2 located in front of, and behind, the display apparatus 100 is not considered. But, according to another exemplary embodiment of the present invention, a method is provided of selectively displaying the reverse image 400 taking into account the number of the first and second users U1 and U2.

For example, the sensor 140 may sense the number of the first users U1 located in front of the display apparatus 100 and the number of the second users U2 located behind the display apparatus 100. The controller 150 compares the number of the first users U1 and the number of the second users U2 sensed by the sensor 140.

If the number of the first users U1 is equal to the number of the second users U2, the controller 150 displays the image 300 and the reverse image 400 together.

If the number of the first users U1 is different from the number of the second users U2, the controller 150 selectively displays one of the image 300 and the reverse image 400 depending on the larger number of users.

Figure 5:
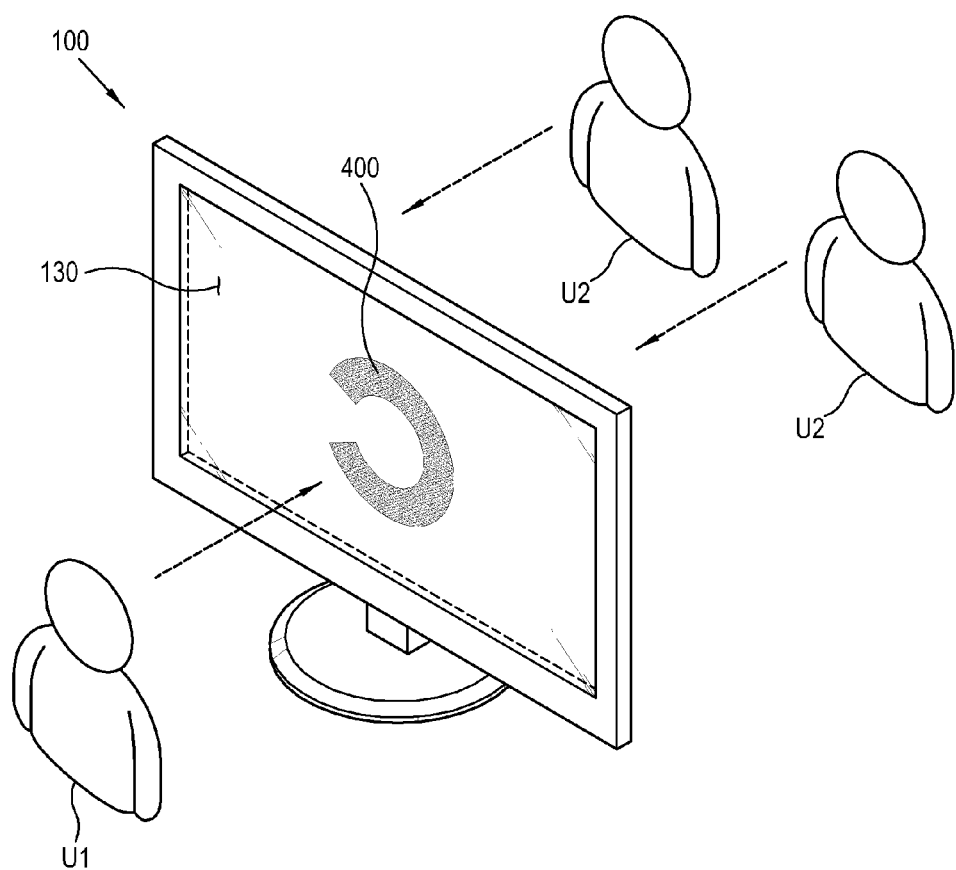
FIG. 5 illustrates an exemplary method of displaying a reverse image by a display apparatus according to an embodiment.

FIG. 5 illustrates an exemplary method of displaying the reverse image 400 by the display apparatus 100 according to an embodiment.

As illustrated therein, a case where the number of the second users U2 located behind the display apparatus 100 is larger than the number of the first users U1 located in front of the display apparatus 100 may be considered. If the number of the second users U2 sensed by the sensor 140 is larger than the number of the first users U1 sensed by the sensor 140, the controller 150 displays on the display panel 130 the reverse image 400 that is normally recognized by the second users U2.

If the number of the first users U1 is larger than the number of the second users U2, the controller 150 displays the image 300 (refer to FIG. 3) that is normally recognized by the first user U1.

Accordingly, the display apparatus 100 may provide the image that may be normally recognized by the larger number of users.

Figure 6:
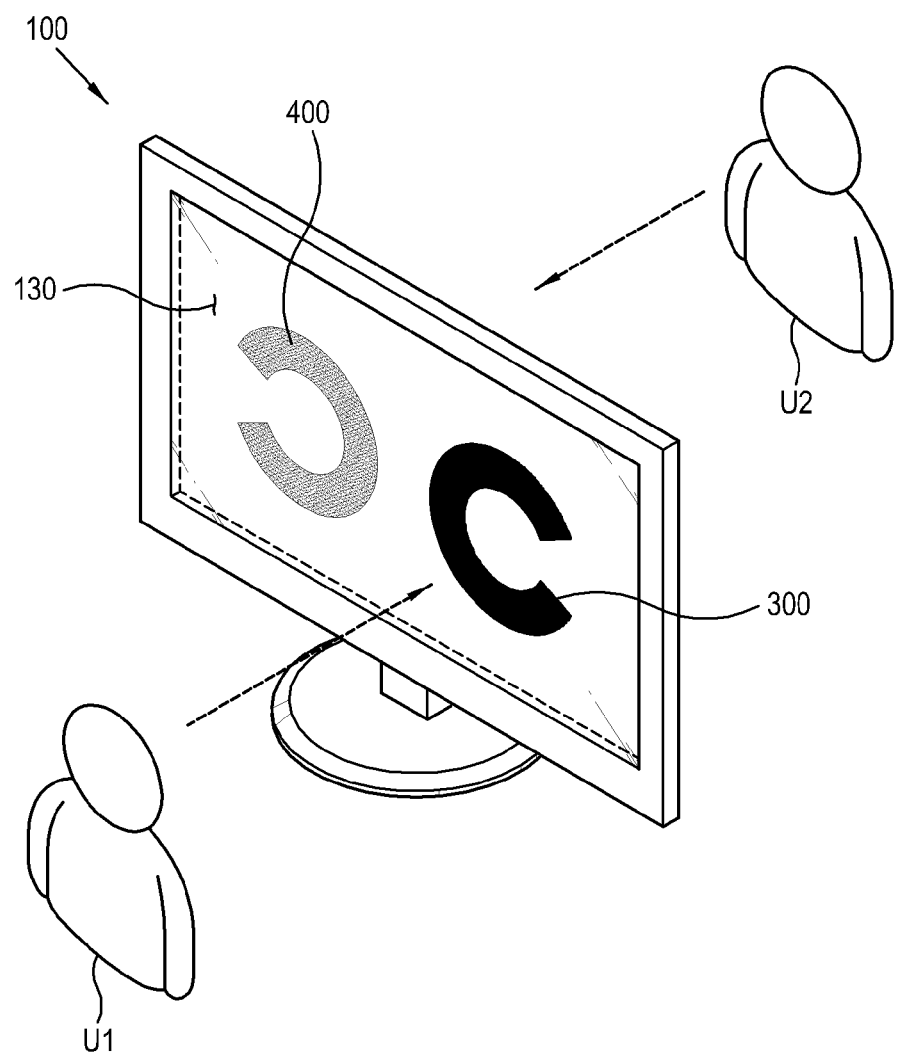
FIG. 6 illustrates an exemplary method of displaying an image and a reverse image by a display apparatus according to an embodiment.

FIG. 6 illustrates an exemplary method of displaying the image 300 and the reverse image 400 by the display apparatus 100 according to an embodiment.

As illustrated therein, the controller 150 displays one of the images 300 and the reverse image 400 that is recognized normally by the users U1 and U2 at respective locations sensed by the sensor 140, adjacently to the sensed location on the display panel 130. Thus, the users U1 and U2 may view the respective images 300 and 400 more easily.

For example, as illustrated in FIG. 6, the first user U1 is located on the right side in front of the display apparatus 100 and the second user U2 is located on the left right behind the display apparatus 100. In this case, the sensor 140 senses the location of the first user U1 and the second user U2, respectively.

With respect to the image 300 that is normally recognized by the first user U1, the controller 150 displays the image 300 at a location adjacent to the right side in front of the display apparatus 100 where the first user U1 is located, e.g., displays the image 300 on the right side on the display panel 130.

With respect to the reverse image 400 that is normally recognized by the second user U2, the controller 150 displays the image 300 at a location adjacent to the left side behind the display apparatus 100 where the second user U2 is located, e.g., displays the image 300 on the left side on the display apparatus 130.

Figure 7:
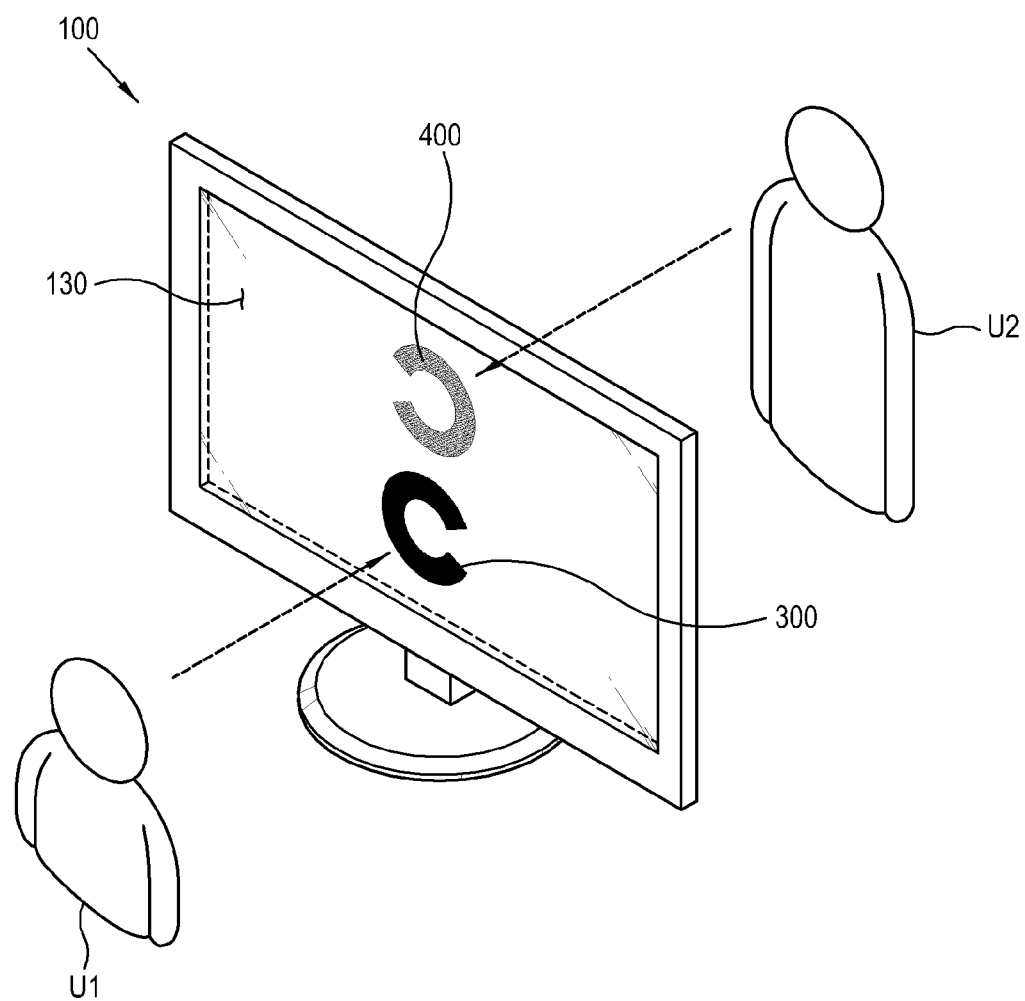
FIG. 7 illustrates an exemplary method of displaying an image and a reverse image by a display apparatus according to an embodiment.

FIG. 7 illustrates an exemplary method of displaying the image 300 and the reverse image 400 by the display apparatus 100 according to an embodiment.

As illustrated therein, the height of a first user's view may be different from the height of a second user's view. For example, if the second user U2 is taller than the first user U1, the height of the first user's view may be lower than the height of the second user's view. The sensor 140 may determine the location of user's eyes within the sensed user's shape to determine the height of the users' view.

The controller 150 displays the image 300 and the reverse image 400 at the location corresponding to the height of the users' view on the display panel 130. For example, if the height of the second user's view is higher than the height of the first user's view, the controller 150 displays the reverse image 400 on the top of the display panel 130, and displays the image 300 on the bottom of the display panel 130.

The users U1 and U2 may easily recognize the image corresponding to the height of their view.

The controller 150 may selectively locate the image 300 and the reverse image 400 on the display panel 130 corresponding to the location of the users U1 and U2.

A method of dividing space for displaying both the image 300 and the reverse image 400 on the display panel 130 by the controller 150 is disclosed. However, the embodiments are not limited to the foregoing, and the image 300 and the reverse image 400 may be alternately displayed as time elapses.

Figure 8:
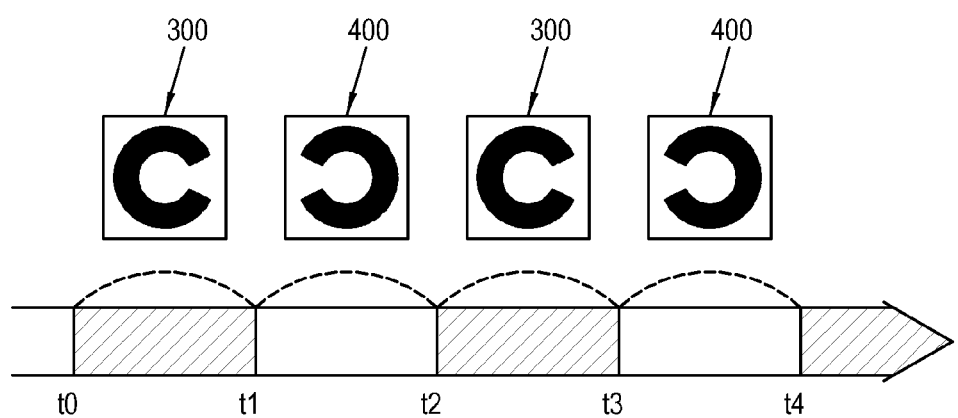
FIG. 8 illustrates an exemplary sequence of displaying an image and a reverse image by a display apparatus according to an embodiment.

FIG. 8 illustrates an exemplary sequence of displaying the image 300 and the reverse image 400 by the display apparatus according to an embodiment.

As illustrated therein, if the users are sensed to be respectively located in front of, and behind, the display apparatus 100 by the sensor 140, the controller 150 may alternately display on the display panel 130 the image 300 for the user located in front of the display apparatus 100 and the reverse image 400 for the user located behind the display apparatus 100.

For example, as time elapses, the controller 150 displays the image 300 during the time from t0 to t1, displays the reverse image 400 during the time from t1 to t2, displays the image 300 during the time from t2 to t3, and displays the reverse image 400 during the time from t3 to t4. That is, the time period from t0 to t1 and from t2 to t3 are time periods during which the image 300 is displayed, and the time period from t1 to t2 and from t3 to t4 are time periods during which the reverse image 400 is displayed.

The controller 150 may set up time period, for example, equally for displaying the image 300 and for displaying the reverse image 400. The image 300 and the reverse image 400 may be alternately displayed on the display panel 130 according to preset time periods.

Figure 9:
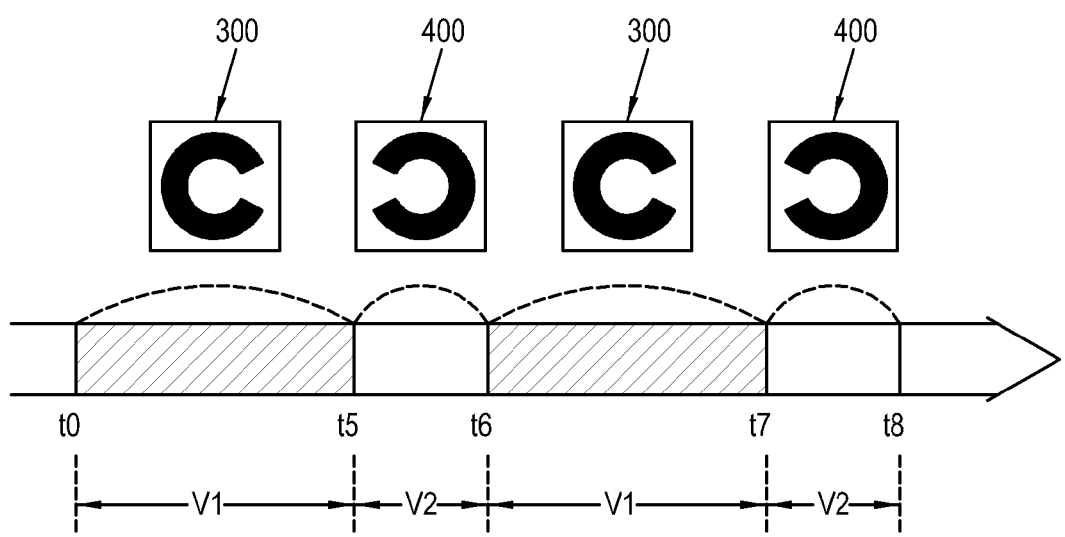
FIGS. 9 and 10 illustrate an exemplary sequence of displaying an image and a reverse image 400 by a display apparatus according to an embodiment.
Figure 10:
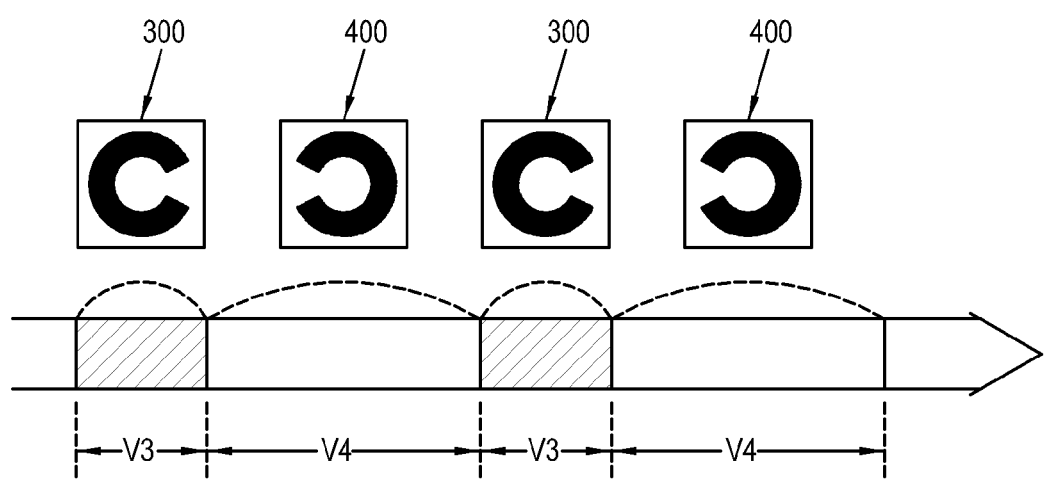

FIGS. 9 and 10 illustrate an exemplary sequence of displaying the image 300 and the reverse image 400 by the display apparatus 100 according to an embodiment.

As illustrated in FIG. 9, the controller 150 may set up different display periods for the image 300 and the reverse image 400, for example, depending on the number of users respectively located in front of, and behind the display apparatus 100 as sensed by the sensor 140.

As time elapses, the controller 150 displays the image 300 for a time period from t0 to t5, displays the reverse image 400 for a time period from t5 to t6, displays the image 300 for a time period from t6 to t7, and displays the reverse image 400 for a time period from t7 to t8. That is, the time period from t0 to t5 and from t6 to t7 is a time period V1 during which the image 300 is displayed, and the time period from t5 to t6 and from t7 to t8 is a time period V2 during which the reverse image 400 is displayed.

If it is determined that there are more users in front of the display apparatus 100 than behind the display apparatus 100, the controller 150 may set the time width of the time period V1 for displaying the image 300 to be longer than the time period V2 for displaying the reverse image 400. Accordingly, the image 300 and the reverse image 400 are alternately displayed on the display panel 130, but the display time of the image 300 is longer than the display time of the reverse image 400.

As illustrated in FIG. 10, if there are more users behind the display apparatus 100 than in front of the display apparatus 100, the controller 150 may set up the time width of the time period V4 for displaying the reverse image 400 to be longer than the time period V3 for displaying the image 300. Accordingly, the image 300 and the reverse image 400 are alternately displayed on the display panel 130, but the display time of the reverse image 400 is longer than the display time of the image 300.

The display apparatus 100 may provide the image 300 or the reverse image 400 to the respective users in front of or behind the display apparatus 100.

An exemplary control method of the display apparatus 100 according to an embodiment is described with reference to FIG. 11.

Figure 11:
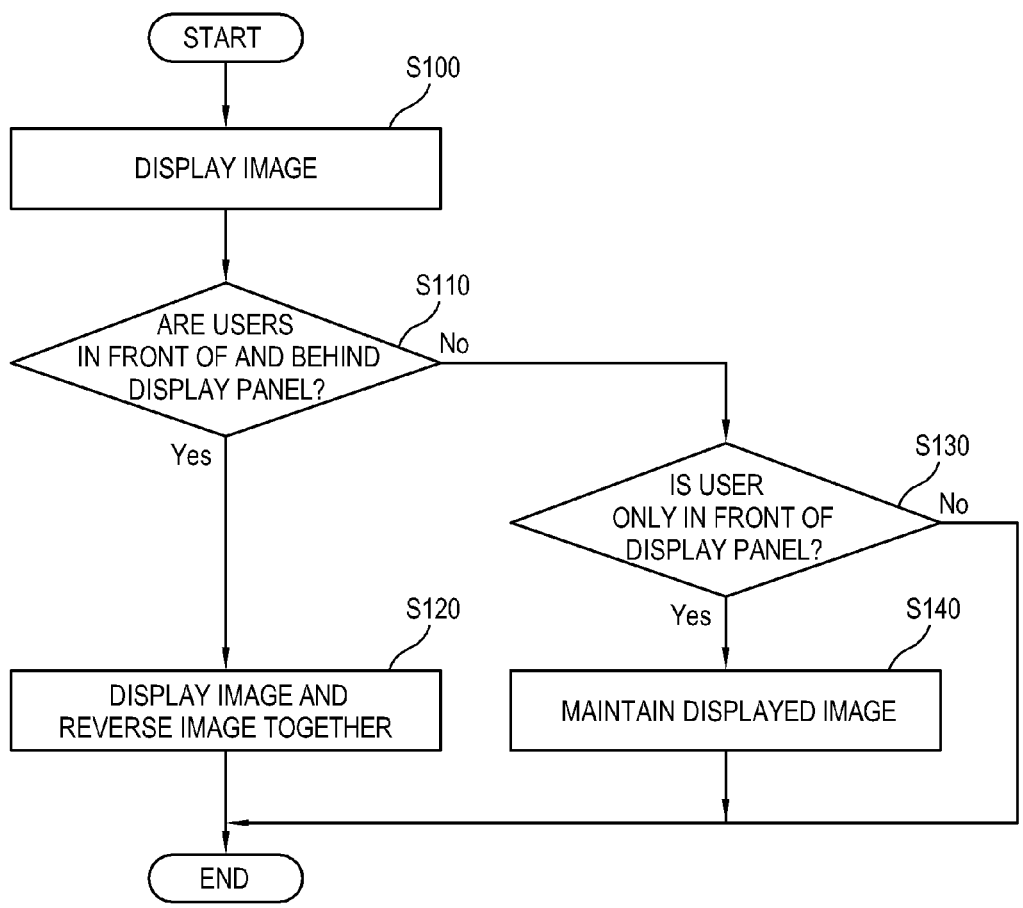
FIG. 11 illustrates an exemplary control method of a display apparatus according to an embodiment.

FIG. 11 illustrates an exemplary control flowchart showing a control method of the display apparatus 100 according to an embodiment.

As illustrated therein, the display apparatus 100 displays a predetermined image (operation S100). The display apparatus 100 determines whether any user is in front of and behind the display apparatus 100 (operation S110).

If it is determined that users are respectively in front of and behind the display apparatus 100, the display apparatus 100 displays the image and the reverse image together (operation S120). If it is determined that a user is only in front of the display apparatus 100 (operation S130), the display apparatus 100 maintains the displayed image (operation S140).

If it is determined that a user is behind the display apparatus 100 only, the display apparatus 100 may maintain the displayed image or may not display the image.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A display apparatus comprising:
a transparent display panel;
an image processor that processes an image signal to display an image on the transparent display panel based on the processed image signal;
a sensor capable of sensing a user located in front of and behind the transparent display panel; and
a controller that determines based on the sensing whether a user is located in front of or behind the transparent display panel, and if the image is displayed on the transparent display panel to be normally recognized by a user located in front of the transparent display panel, controls the image processor to selectively display on the transparent display panel a reverse image of the image to be normally recognized by a user located behind the transparent display panel according to the determination,
wherein a user located in front of the transparent display panel faces a first surface of the transparent display panel and a user located behind the transparent display panel faces a second surface of the transparent display panel that is a different surface of the transparent display panel and opposing the first surface, and
wherein the controller compares a number of users located in front of the transparent display panel sensed by the sensor with a number of users located behind the transparent display panel sensed by the sensor, and selectively displays the reverse image according to the comparison result.

2. The display apparatus according to claim 1, wherein if the sensor senses that users are in front of and behind the transparent display panel, respectively, the controller displays the image and the reverse image together.

3. The display apparatus according to claim 2, wherein the controller compares the number of users located in front of the transparent display panel sensed by the sensor and the number of users located behind the transparent display panel sensed by the sensor, and if it is sensed that the number of users located in front of the transparent display panel is equal to the number of users located behind the transparent display panel, displays the image and the reverse image together.

4. The display apparatus according to claim 2, wherein the controller determines a user's location by the sensor, and displays one of the image and the reverse image that is normally recognized by a user located at a determined location, adjacently to the determined location on the transparent display panel.

5. The display apparatus according to claim 2, wherein the controller displays one of the image and the reverse image that is normally recognized by a user located at the determined location, in a location corresponding to a height of a user's sight sensed by the sensor.

6. The display apparatus according to claim 1, wherein if the number of users located in front of the transparent display panel is larger than the number of users located behind the transparent display panel, the controller displays the image, and if the number of users located behind the transparent display panel is larger than the number of users located in front of the transparent display panel, displays the reverse image.

7. The display apparatus according to claim 1, wherein if it is sensed through the sensor that users are respectively located in front of and behind the transparent display panel, the controller alternately displays the image and the reverse image.

8. The display apparatus according to claim 7, wherein the controller compares the number of users located in front of the transparent display panel sensed by the sensor with the number of users located behind the transparent display panel sensed by the sensor, and according to the comparison results, differently sets up a display period of the image and a display period of the reverse image.

9. The display apparatus according to claim 8,
wherein if the number of users located in front of the transparent display panel is larger than the number of users located behind the transparent display panel, the controller sets up the display period of the image to be longer than the display period of the reverse image, and if the number of users located behind the transparent display panel is larger than the number of users located in front of the transparent display panel, sets up the display period of the reverse image to be longer than the display period of the image.

10. A control method of a display apparatus comprising a transparent display panel, the control method comprising:
displaying an image on the transparent display panel to be normally recognized by a user located in front of the transparent display panel out of users respectively located in front of and behind the transparent display panel;

sensing users respectively located in front of and behind the transparent display panel; and selectively displaying on the transparent display panel a reverse image of the image to be normally recognized by a user located behind the transparent display panel according to the sensing result, wherein a user located in front of the transparent display panel faces a first surface of the transparent display panel and a user located behind the transparent display panel faces a second surface of the transparent display panel that is a different surface of the transparent display panel and opposing the first surface, wherein the selectively displaying the reverse image comprises comparing a number of users located in front of the transparent display panel with a number of users located behind the transparent display panel, and selectively displaying the reverse image according to the comparison result.

11. The control method according to claim 10, wherein the selectively displaying the reverse image comprises displaying the image and the reverse image together if it is sensed that users are located respectively both in front of and behind the transparent display panel.

12. The control method according to claim 11, wherein the displaying the image and the reverse image together comprises comparing a number of users located in front of the transparent display panel with a number of users located behind the transparent display panel, and if the number of users located in front of the transparent display panel is equal to the number of users located behind the transparent display panel, displaying the image and the reverse image together.

13. The control method according to claim 11, wherein the displaying the image and the reverse image together comprises sensing a user's location, and displaying one of the image and the reverse image that is normally recognized by a user located at the sensed location, adjacently to the sensed location on the transparent display panel.

14. The control method according to claim 11, wherein the displaying the image and the reverse image together comprises displaying one of the image and the reverse image that is normally recognized by a user located at the sensed location, at a location corresponding to a height of a user's sight sensed by the sensor.

15. The control method according to claim 10, wherein the selectively displaying the reverse image comprises displaying the image if the number of users located in front of the transparent display panel is larger than the number of users located behind the transparent display panel, and displaying the reverse image if the number of users located behind the transparent display panel is larger than the number of users located in front of the transparent display panel.

16. The control method according to claim 10, wherein the selectively displaying the reverse image comprises alternately displaying the image and the reverse image if it is sensed that users are respectively located in front of and behind the transparent display panel.

17. The control method according to claim 16, wherein the alternately displaying the image and the reverse image comprises comparing the number of users located in front of the transparent display panel with the number of users located behind the transparent display panel and according to the comparison result, differently setting up a display period of the image and a display period of the reverse image.

18. The control method according to claim 17, wherein the setting up the display period of the image and the display period of the reverse image differently comprises setting up the display period of the image to be longer than the display period of the reverse image if the number of users located in front of the transparent display panel is larger than the number of users located behind the transparent display panel, and setting up the display period of the reverse image to be longer than the display period of the image if the number of users located behind the transparent display panel is larger than the number of users located in front of the transparent display panel.

* * * * *